United States Patent
Fleury et al.

(10) Patent No.: US 9,412,191 B2
(45) Date of Patent: Aug. 9, 2016

(54) SEX SELECTION IN INHERITANCE BASED AVATAR GENERATION

(75) Inventors: Michel Fleury, Montreal (CA); David Chamandy, Montreal (CA)

(73) Assignee: AUTODESK, INC., San Rafael, CA (US)

(*) Notice: Subject to any disclaimer, the term of this patent is extended or adjusted under 35 U.S.C. 154(b) by 1139 days.

(21) Appl. No.: 12/155,725

(22) Filed: Jun. 9, 2008

(65) Prior Publication Data

US 2008/0303829 A1    Dec. 11, 2008

Related U.S. Application Data

(60) Provisional application No. 60/929,056, filed on Jun. 11, 2007.

(51) Int. Cl.
*G06T 15/70* (2006.01)
*G06T 13/40* (2011.01)

(52) U.S. Cl.
CPC ....................... *G06T 13/40* (2013.01)

(58) Field of Classification Search
CPC ......... G06T 11/00; G06T 11/60; G06T 19/00; G06T 17/00; A41H 3/007
USPC ......... 345/473, 594, 581, 619, 629, 630, 639, 345/640, 646, 950, 955
See application file for complete search history.

(56) References Cited

U.S. PATENT DOCUMENTS

| | | | |
|---|---|---|---|
| 5,568,599 A * | 10/1996 | Yoshino et al. | 345/630 |
| 5,808,624 A * | 9/1998 | Ikedo | 345/630 |
| 6,545,682 B1 | 4/2003 | Ventrealla et al. | |
| 6,563,503 B1 | 5/2003 | Comair et al. | |
| 7,006,093 B2 * | 2/2006 | Fujiwara et al. | 345/441 |
| 7,025,675 B2 | 4/2006 | Fogel et al. | |
| 7,173,625 B2 | 2/2007 | Nam et al. | |
| 7,184,047 B1 * | 2/2007 | Crampton | 345/473 |

(Continued)

FOREIGN PATENT DOCUMENTS

WO    WO0159709 A1    8/2001

OTHER PUBLICATIONS

ISA/CA, "International Search Report", mailed Sep. 10, 2008, pp. 1 to 3.

(Continued)

*Primary Examiner* — Todd Buttram
(74) *Attorney, Agent, or Firm* — Artegis Law Group, LLP

(57) ABSTRACT

The generation of characters within computer animations is currently a labor intensive and expensive activity for a wide range of businesses. Whereas prior art approaches have sought to reduce this loading by providing reference avatars, these do not fundamentally overcome the intensive steps in generating these reference avatars, and they provide limited variations. According to the invention a user is provided with a simple and intuitive mechanism to affect the weightings applied in establishing the physical characteristics of an avatar generated using an inheritance based avatar generator. The inheritance based generator allowing, for example, the user to select a first generation of four grandparents, affect the weightings in generating the second generation parents, and affect the weightings in generating the third generation offspring avatar from these parents. Accordingly the invention provides animators with a means of rapidly generating and refining the off-spring avatar to provide the character for their animated audio-visual content.

19 Claims, 9 Drawing Sheets

(56) References Cited

U.S. PATENT DOCUMENTS

| | | | |
|---|---|---|---|
| 7,574,332 B2 * | 8/2009 | Ballin et al. | 703/2 |
| 7,677,974 B2 * | 3/2010 | Van Luchene | 463/29 |
| 7,707,520 B2 * | 4/2010 | Ashtekar et al. | 715/855 |
| 7,733,338 B2 * | 6/2010 | Couture-Gagnon | 345/419 |
| 7,806,758 B2 * | 10/2010 | Van Luchene | 463/1 |
| 7,840,903 B1 | 11/2010 | Amidon et al. | |
| 7,912,793 B1 | 3/2011 | Danzig et al. | |
| 2004/0250210 A1 | 12/2004 | Huang et al. | |
| 2005/0026685 A1 | 2/2005 | Ruark et al. | |
| 2005/0162419 A1 | 7/2005 | Kim et al. | |
| 2006/0195789 A1 | 8/2006 | Rogers et al. | |
| 2006/0294465 A1 | 12/2006 | Ronen et al. | |
| 2007/0123327 A1 | 5/2007 | Van Luchene | |
| 2007/0273711 A1 * | 11/2007 | Maffei | 345/630 |
| 2007/0298866 A1 | 12/2007 | Gaudiano et al. | |
| 2008/0147424 A1 | 6/2008 | Rowan et al. | |
| 2009/0055754 A1 | 2/2009 | Feeney et al. | |
| 2010/0018382 A1 * | 1/2010 | Feeney et al. | 84/615 |
| 2010/0070859 A1 | 3/2010 | Shuster et al. | |
| 2010/0118025 A1 | 5/2010 | Smith et al. | |
| 2010/0121915 A1 * | 5/2010 | Wang | 709/203 |

OTHER PUBLICATIONS

Office Action for U.S. Appl. No. 12/155,886 dated Mar. 30, 2011.
Notice of Allowance for U.S. Appl. No. 12/155,886 dated Nov. 2, 2011.

* cited by examiner

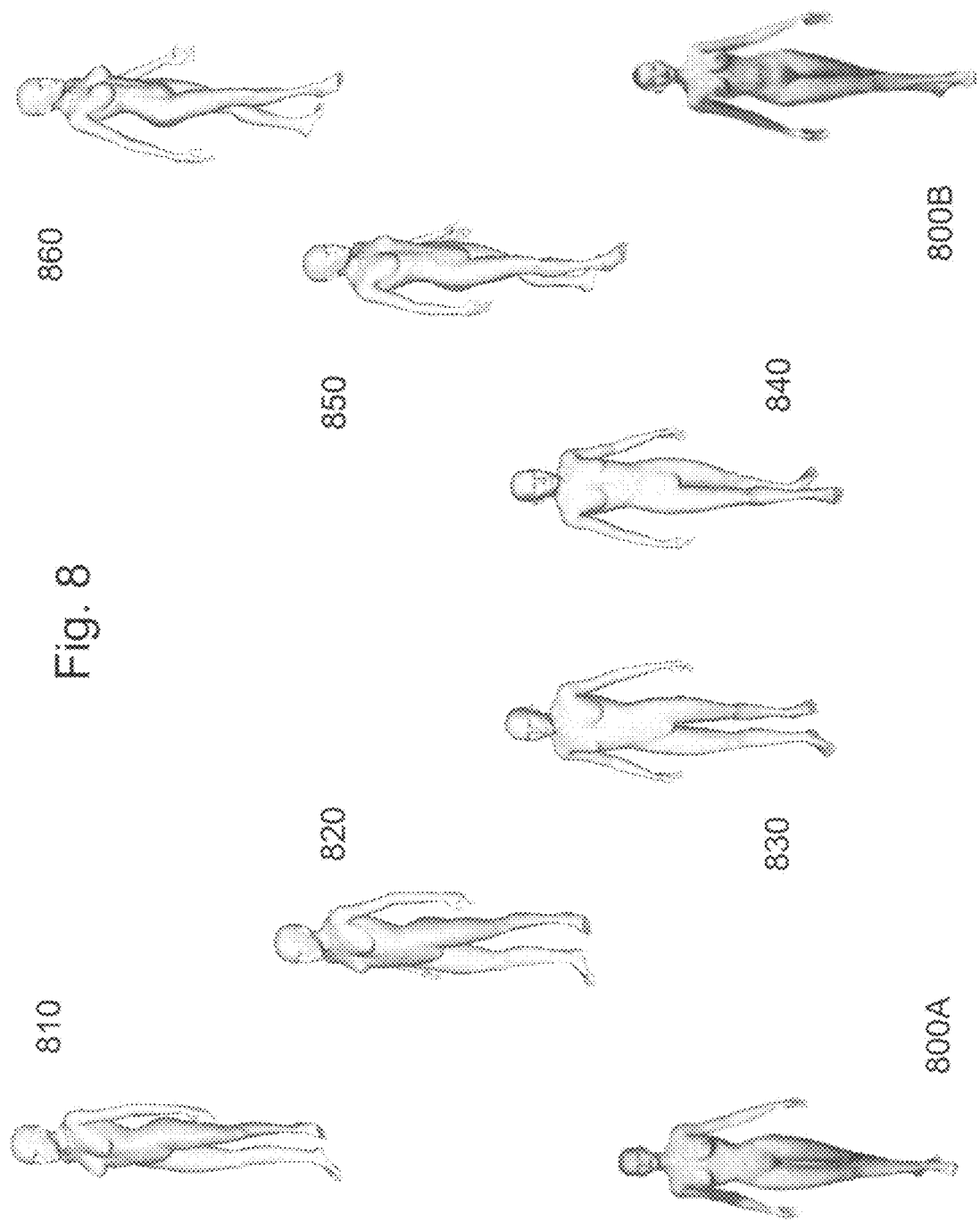

SEX SELECTION IN INHERITANCE BASED AVATAR GENERATION

This application claims the benefit of U.S. Provisional Application No. 60/929,056 filed on Jun. 11, 2007, the entire content of which is incorporated herein by reference.

FIELD OF THE INVENTION

The invention relates to computer graphics and more particularly to computer character generation for use in animation.

BACKGROUND OF THE INVENTION

Computer animation, the art of creating moving images via the use of computers, is a common form of audio-visual presentation, where the provided content ranges from television programming, television advertisements, feature movies, short films, cartoons, music videos, computer games and video games. Further these different forms of computer animation, traditionally presented to the user via a television or within the movie theatre are now presented with, and supported by, a multitude of electronic devices including personal computers (PCs), laptop computers, Personal Digital Assistant (PDA), video game consoles (consoles), handheld game consoles (handhelds), cellular telephones (cellphones), and portable multimedia players.

Economically, such computer animation in the form of physical and online sales represents a global business today of approximately $40 billion in 2006 and is expected to grow to over $65 billion by 2010. The dominant segments of this market being computer animated feature films, computer games, console games and handheld games.

In addition to this significant global economic element of "entertainment oriented animation" there is an immense amount of animation generated by individuals and businesses for a wide variety of uses ranging from advertisements, education, etc. Whilst difficult to provide economics an estimate of the quantity of such material may be estimated from quick searches using Yahoo and Google, within their specific video databases for animations. Such searches return 153,000 and 98,000 animated videos as of Jun. 5, 2007.

In computer animation, commercially available systems are essentially digital successors to the art of stop motion animation of 3D models and frame-by-frame animation of 2D illustrations. Some examples of current animation software include Amorphium®, Art of Illusion®, Poser®, Ray Dream Studio®, Bryce®, Maya®, Blender®, TrueSpace®, Lightwave®, 3D Studio Max®, SoftImage XSI®, Alice®, and Adobe Flash® (2D).

For 3D animations of characters, the characters are modeled on the computer monitor and 3D figures are rigged with a virtual skeleton. For 2D figure animations, separate illustrations and separate transparent layers are used, with or without a virtual skeleton. Then the limbs, eyes, mouth, clothes, etc. of the figure are moved by the animator on key frames. The differences in appearance between key frames are automatically calculated by the computer in a process known as tweening or morphing. Finally, the animation is rendered, the rendering providing the features of the skin, clothing, etc.

It would be apparent that within the thousands of different computer game titles and tens of thousands of different animated videos that a significant amount of work is expended in generating the virtual skeletons, providing the character models, and rendering the physical forms of the characters. Presently, this is typically done by specialised artists. This has a corresponding cost to a studio or animator in producing the audio-visual content with computer animation. These costs increase essentially linearly with the number of characters, as they are all generated individually, and with the degree of resolution applied in generating the models. For example, characters within background may be modelled and rendered at low resolution, whilst characters in foreground are modelled and rendered at high resolution, particularly the main characters. The lower complexity of generating a wide variety of characters such as fantasy characters and cartoon-like humans influences the decisions that studios, animators and others make in generating their computer animation. Even so, the costs of generating computer animated characters are significant and clearly evident when one considers that even animated films with fantasy characters and cartoon-like humans such as "Shark Tale", "Toy Story 2", "Incredibles" and "Finding Nemo" have production costs ranging from US$80 million to over US$100 million per motion picture.

Throughout the remainder of this document the term "avatar" is employed to refer to a computer animated character. Originating from video games, "avatars" are essentially a player's physical computer animated representation in the game world. Typically, a video game offers the player a single avatar or a predetermined limited set of avatars from which to select as the basis of their "player" within the game. As such these avatars have been generated typically in accordance with the process presented supra in respect of skeletons, wireframes, and rendering. Online games such as "Second Life" provide only 12 avatars for the user to select from, whilst video games such as "Alien Arena 2007" (COR Entertainment) offers 11 avatars for the player to base their player upon.

Recently to reduce the complexity for animators in generating avatars for their audio-visual content, some commercial software suites offer the animator such a library of stock avatars to select from. One such leading commercial software suite being "iClone 2.0" from RealIllusion, which offers 15 base avatars for the animator to select from. Unfortunately, this is very limited.

It would therefore be beneficial to provide a way for an animator to rapidly generate an avatar and manipulate their characteristics. Further, rather than requiring the animator to always envision, provide a skeleton, wire frame and render their avatar completely it would be beneficial to provide a solution offering the animator the ability to start or select a relatively small number of input selections, and provide simple intuitive interfaces allowing them to focus their creative skills on the manipulation and refinement of the avatar, whilst offering them a wide range of potential outcomes.

SUMMARY OF EMBODIMENTS OF THE INVENTION

The instant application hereby incorporates by reference the entire contents of U.S. Provisional Patent Application No. 60/929,056, filed on Jun. 11, 2007.

In accordance with an aspect of the invention there is provided a method comprising: providing at least two avatars, each one of the at least two avatars having a different simulated physical appearance that is defined in terms of a plurality of inheritable characteristics; providing a weighting factor for defining a relative contribution of at least one of the plurality of inheritable characteristics from each of the at least two avatars to a simulated physical appearance of an Off-Spring avatar, the weighting factor selected by a user; providing an indication of the sex of the Off-Spring avatar; generating the Off-Spring avatar in dependence upon the plurality of inheritable characteristics of the at least two avatars, the weighting factor, and the indication of the sex of the Off-Spring avatar; and at least one of storing the Off-Spring avatar on a computer readable storage medium and displaying the simulated physical appearance of the Off-Spring avatar to the user.

In accordance with an aspect of the invention there is provided a method comprising: providing a virtual environment, the virtual environment supporting a plurality of avatars associated with a plurality of users, each avatar having a plurality of physical characteristics; providing within the virtual environment an ability for at least two avatars to have an Off-Spring avatar; generating the Off-Spring avatar, in dependence upon at least some of the plurality of physical characteristics of the at least two avatars, a weighting provided by at least a user of the plurality of users, and an indication of the sex of the Off-Spring avatar provided by at least a user of the plurality of users; and at least one of storing the off-spring avatar on a computer readable storage medium and displaying a simulated physical appearance of the Off-Spring avatar to the user.

In accordance with an aspect of the invention there is provided a method comprising:
  (a) providing a current generation of avatars comprising at least two different avatars, each of the at least two different avatars having at least one physical characteristic contributing to a unique simulated physical appearance thereof;
  (b) receiving from a user a weighting factor for establishing a weighting in combining the at least one physical characteristic of the at least two different avatars;
  (c) receiving from the user an indication of the sex of a next generation avatar;
  (d) executing an inheritance based avatar generator process for generating a next generation avatar, the at least one physical characteristic of the next generation avatar being established in dependence upon the at least one physical characteristic of each of the at least two different avatars, the weighting factor and the indication of the sex of the next generation avatar; and,
  (e) at least one of storing on a computer readable storage medium data relating to the at least one physical characteristic of the next generation avatar and displaying the next generation avatar to the user.

BRIEF DESCRIPTION OF THE DRAWINGS

Exemplary embodiments of the invention will now be described in conjunction with the following drawings, in which:

FIG. 8 illustrates full body avatars generated according to an exemplary embodiment of the three-generation inheritance based avatar generator invention wherein sex selection has been enabled, and set to female.

DETAILED DESCRIPTION OF EMBODIMENTS OF THE INVENTION

Figure 1:
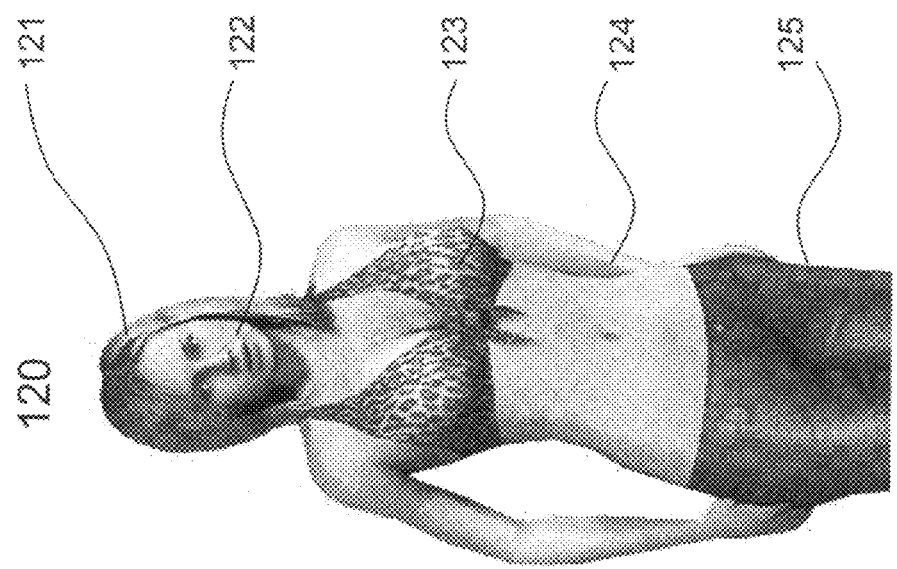
FIG. 1 illustrates a prior art approach to generating an avatar using a wire-frame model and polygon filling.
Figure 1:
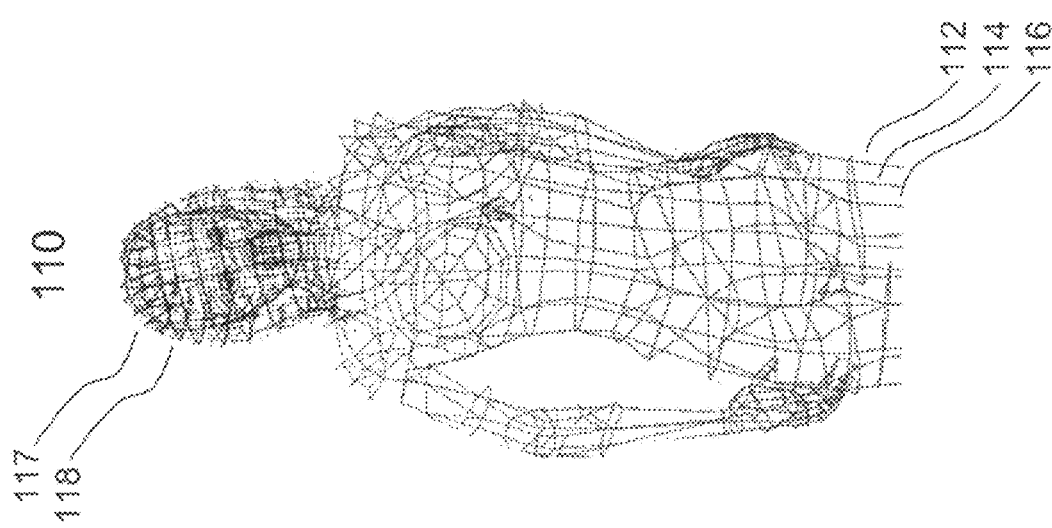

Referring to FIG. 1 illustrated is a prior art approach to generating an avatar using a wire-frame model 110 and finished model 120. The wire-frame model 110 is typically generated by the avatar programmer and consists of polygons, such as coarse polygons 112 through 116 in regions of general body shape, and fine polygons 117 and 118 in regions of the body requiring more detail. After completing the wire-frame model 110 the avatar programmer selects the fill for the coarse polygons 112 through 116 and fine polygons 117 and 118 according to the clothing and body of the avatar being generated.

As shown, the polygons of wire-frame model 110 are filled according to hair 121, face features 122, bikini top 123, body 124 and trousers 125, therein resulting in the finished model 120. The finished model 120 is then stored by the avatar programmer for use within a video game, computer game or other animated audio-visual content.

Figure 2A:
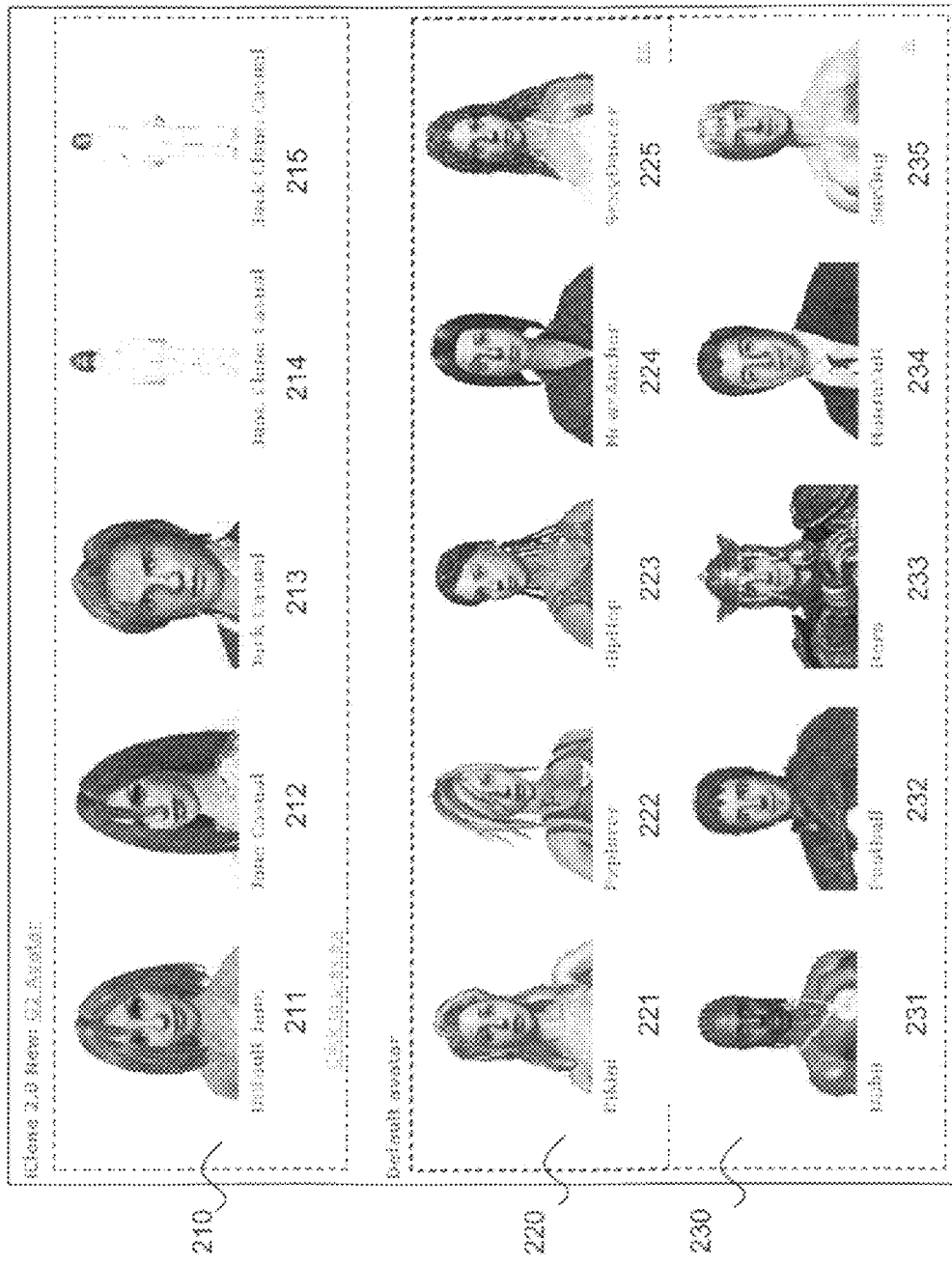
FIG. 2A illustrates a prior art software package providing pre-generated avatars for video game programmers.

With the proliferation of video games, computer games, animated films, etc. an organization generating such content may not wish to expend its resources, financial or physical, in generating avatars. As a result an aspect of the industry is the purchase of pre-designed avatars from an avatar programmer, such as referred to in FIG. 1 generating the finished model 120. An example of an avatar menu 200 is shown in FIG. 2A from the commercial avatar set "iClone 2.0" from iClone Inc. As such the purchaser of the avatar set "iClone 2.0" is presented with an avatar menu 200 comprising three groups, the first being "G2 Avatar" 210, the second "Girl Avatar" 220, and finally "Boy Avatar" 230. Within the "G2 Avatar" 210 group are three complete avatars, similar to finished model 120 of FIG. 1, being "Default Jane" 211, "Jane Casual" 212, and "Jack Casual" 213. Also within the "G2 Avatar" 210 are partially completed avatars "Jane Clone Casual" 214 and "Jack Clone Casual" 215 which have blank clothing but completed heads and facial features.

"Girl Avatar" 220 as shown comprises clothed and completed models, similar to finished model 120 of FIG. 1 using the "Jane" figure as employed in "Default Jane" 211, "Jane Casual" 212 and "Jane Clone Casual" 214. As such, shown are "Bikini" 221, "Explorer" 222, "Hip-Hop" 223, "News Anchor" 224, and "Sexy Dancer" 225. Similarly "Boy Avatar" 230 as shown comprises clothed and completed models, similar to finished model 120 of FIG. 1 using the "Jack" figure as employed in "Default Jack" 213 and "Jack Clone Casual" 215. As such, shown are "Dabu" 231, "Football" 232, "Hero" 233, "Man in Suit" 234, and "Surfing" 235. It would be apparent to the reader that in some instances the avatars by being generated from common source avatars, such as "Jane Clone Casual" 214 and "Jack Clone Casual" 215, have not been executed flawlessly, see for example "Surfing" 235.

Figure 3:
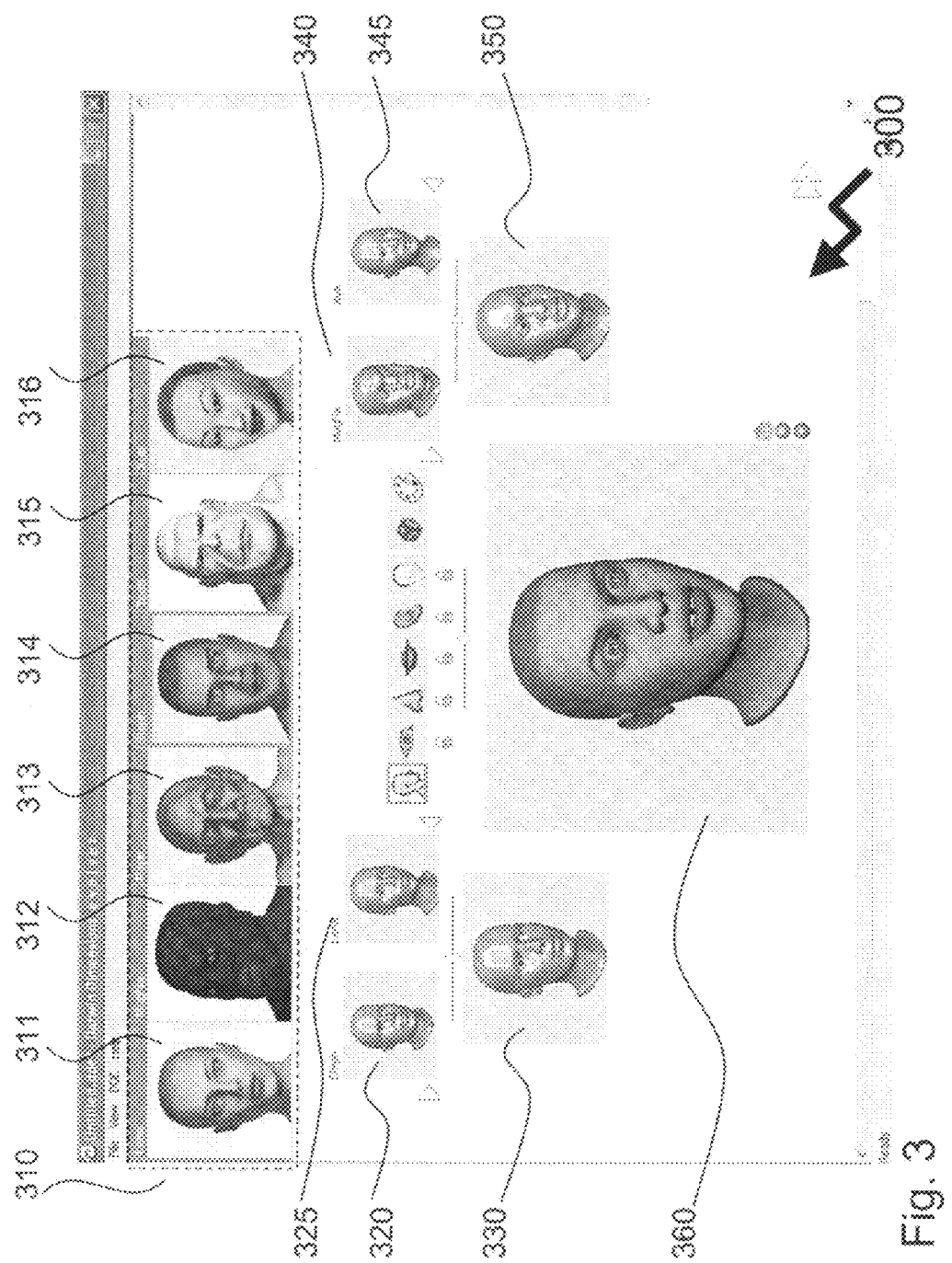
FIG. 3 illustrates a three-generation inheritance based avatar generator according to an embodiment of the invention for weighting grandparents for each parent and between parental families.

A developer of audio-visual content such as a video game or computer game comprising avatars, whether implementing avatars directly, such as discussed supra in respect of FIG. 1, or importing avatars from a commercial library such as presented supra in respect of FIG. 2A, will typically provide a user with an avatar selection page 250. Avatar selection page 250 being taken from the online virtual reality environment "Second Life". Accordingly the user is provided with two groups, "Females" 260 comprising female avatars 261 through 266, and "Men" 270 comprising male avatars 271 through 276. The user has selected female avatar 266 from "Females" 260, the selected female avatar 266 is displayed complete as full figure 280 and name "Nightclub-Female". A limitation of the approach presented in avatar selection page 250 is that only 12 avatars are provided to the user for selection, which may not seem overly limiting to one user, but "Second Life" as of May 2007 had over 6 million registered users within the virtual reality environment, approximately 500,000 of each "Female" 261 through 266 and "Male" 271 through 276. It would be beneficial to provide a means of rapidly generating avatars either from the viewpoint of an avatar generator, such as the programmer in FIG. 1 for individual characters, crowds, etc., or users within their gaming environment. It would be further beneficial for the invention to allow the individual generating the avatar to mimic, and simply adjust, weightings that occur within a genetically derived avatar generator that provides inheritance based development of an avatar. Such a three-generation inheritance based avatar generator 300 according to an embodiment of the invention for weighting grandparents for each parent and between parental families is shown in FIG. 3.

When employing the three-generation inheritance based avatar generator 300 a user selects four grandparents from a pool 310 of avatar characters. In the three-generation inheritance based avatar generator 300 the avatar characters are "Lena" 311, "MugNa" 312, "Pepe" 313, "Steph" 314, "Todd" 315, and "Xua" 316. Accordingly the user has selected "Steph" 314 as paternal grandfather 320, "Lena" 311 as paternal grandmother 325, "MugNa" 312 as maternal grandfather 340, and "Xua" 316 as maternal grandmother 345. The terms maternal and paternal as employed within the embodiments are to differentiate the two sets of grandparents. As will be evident in respect of the embodiments the requirement for both sexes in the parents giving "birth" to the child within a software based inheritance based avatar generator is not necessarily a requirement, although optionally it may be set as one. The three-generation inheritance based avatar generator 300 therein generates the second generation comprising "Parent 1" 330, and "Parent 2" 350, and thereafter the third generation avatar-off-spring 360 of "Parent 1" 330 and "Parent 2" 350. It would be apparent that three-generation inheritance based avatar generator 300 provides the user with an additional aspect of their game, if embedded within a game, allowing their avatar to be determined from a plurality of choices and inputs rather than a single click of a cursor over one image.

Figure 2B:
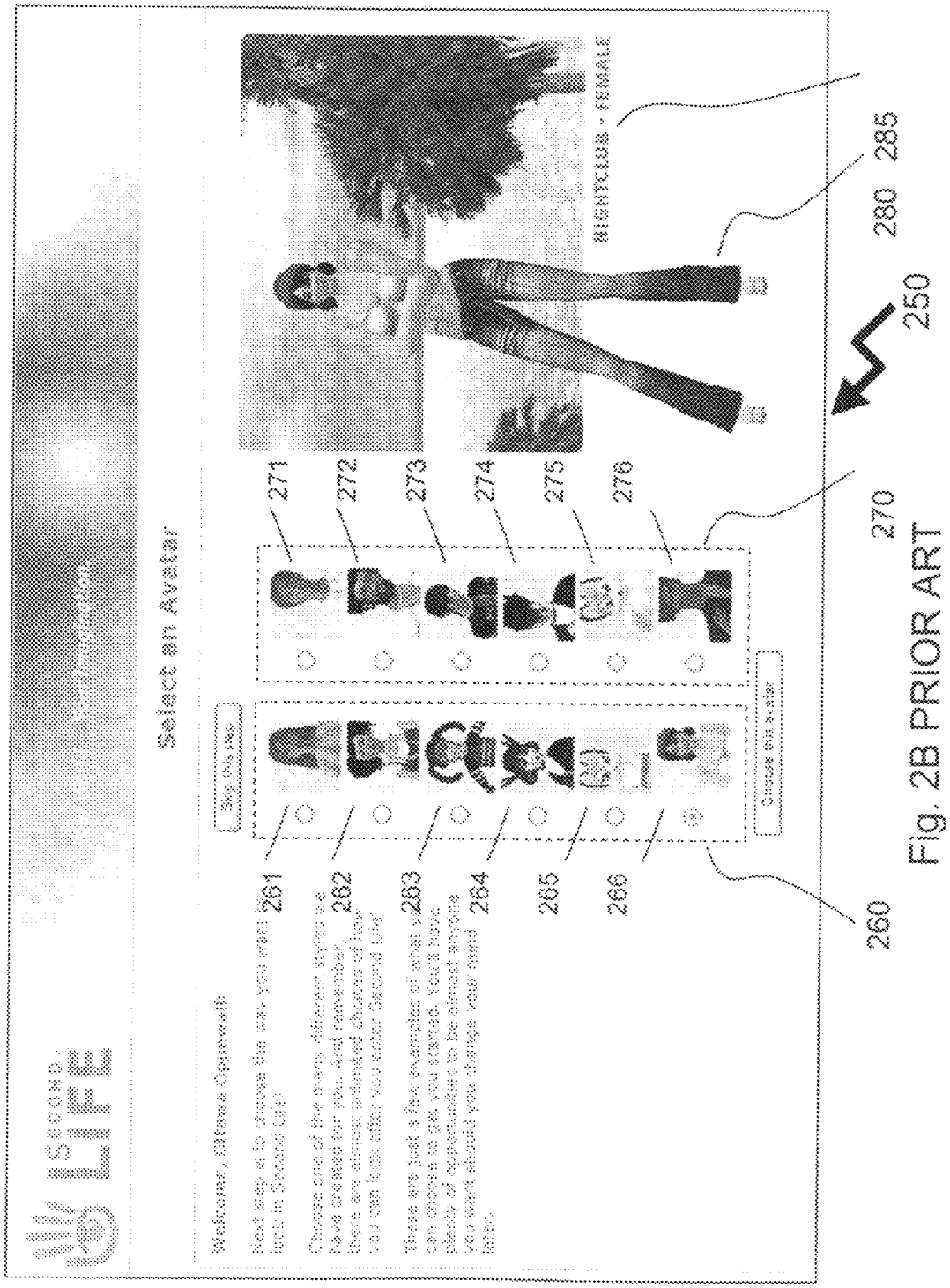
FIG. 2B illustrates a prior art avatar selection page for the online virtual reality environment "Second Life"

Optionally, introducing the three-generation inheritance based avatar generator 300 into an online virtual reality environment such as "Second Life" as discussed supra in respect of FIG. 2B, allows for expansion of features such as allowing characters to procreate and have offspring, these offspring generated in accordance with predetermined or dynamically associated weightings from the environment, game status etc.

Within the embodiment of the three-generation inheritance based avatar generator 300 the user is not required to select "male" characters for paternal grandfather 320 and maternal grandfather 340, and "female" characters for maternal grandfather 325 and maternal grandmother 345. Alternatively the three-generation inheritance based avatar generator 300 may place limitations on the characteristics of the avatar characters, such as avatar characters 311 through 316, such as sex, relatives having predetermined relationships, ethnicity, or being human, of defined "alien" race etc.

Figure 4:
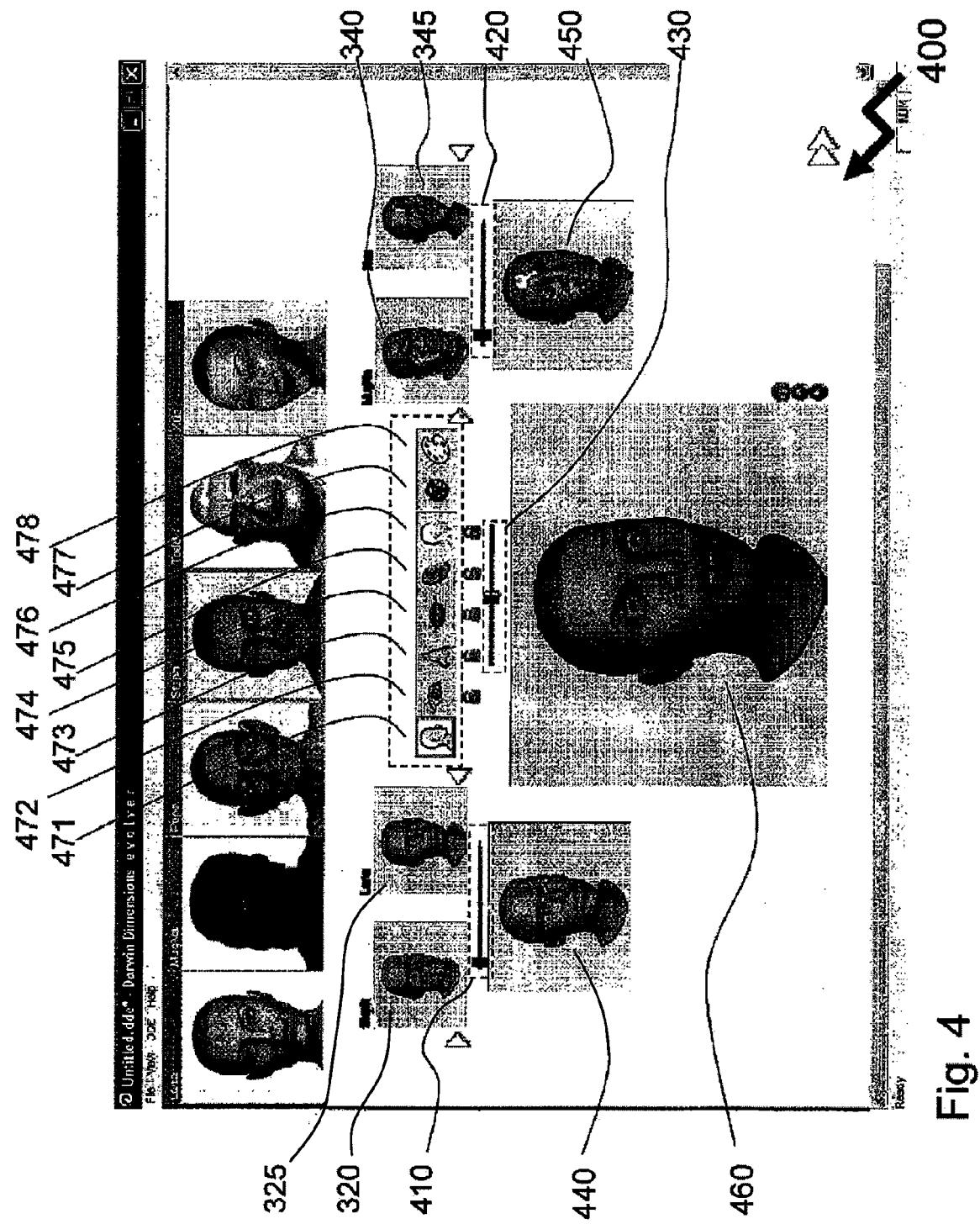
FIG. 4 illustrates the three-generation inheritance based avatar generator of FIG. 3 highlighting the slider-bars according to an embodiment of the invention set to an alternate weighting favoring grandfathers.

Referring now to FIG. 4, illustrated is the three-generation inheritance based avatar generator 400, equivalent to the three-generation inheritance based avatar generator 300 of FIG. 3, highlighting the slider-bars 410 through 430 having an indicating portion being set to an alternate weighting that favors the grandfathers. As such, within the three-generation inheritance based avatar generator 400 the avatar grandparents are "Steph" 314 as paternal grandfather 320, "Lena" 311 as paternal grandmother 325, "MugNa" 312 as maternal grandfather 340, and "Xua" 316 as maternal grandmother 345. In the instant example, the user has moved the paternal slider-bar 410 to the leftmost position, favoring the male grandparent "Steph" 314 on the paternal side, resulting in "Weighted Parent 1" 440. Similarly, maternal slider-bar 420 has been set to its leftmost position, favoring the male grandparent "MugNa" 312 on the maternal side, resulting in "Weighted Parent 2" 450. In this way, the user provides weighting factors for defining a relative contribution of at least one of the plurality of inheritable characteristics from each of the paternal grandparent avatars to a simulated physical appearance of "weighted Parent 1" 440, and for defining a relative contribution of at least one of the plurality of inheritable characteristics from each of the maternal grandparent avatars to a simulated physical appearance of "Weighted Parent 2" 450. The three-generation inheritance based avatar generator 400 uses "Weighted Parent 1" 440 and "Weighted Parent 2" 450 for generating weighted third generation avatar-off-spring 460. In generating the weighted third generation avatar-off-spring 460 the third generation inheritance based avatar generator 400 utilizes family weighting slide-bar 430 to adjust the weighting applied between "Weighted Parent 1" 440 and "Weighted Parent 2" 450.

As also reflected in FIG. 4, a user may select a physical characteristic 471, 472, 473, 474, 475, 476, 477, and 478 for any of the avatar grandparents (i.e., the avatar grandmothers 325, 345 and the avatar grandfathers 320, 340) and add the selected characteristic to the set of physical characteristics describing that particular avatar grandparent.

Figure 5:
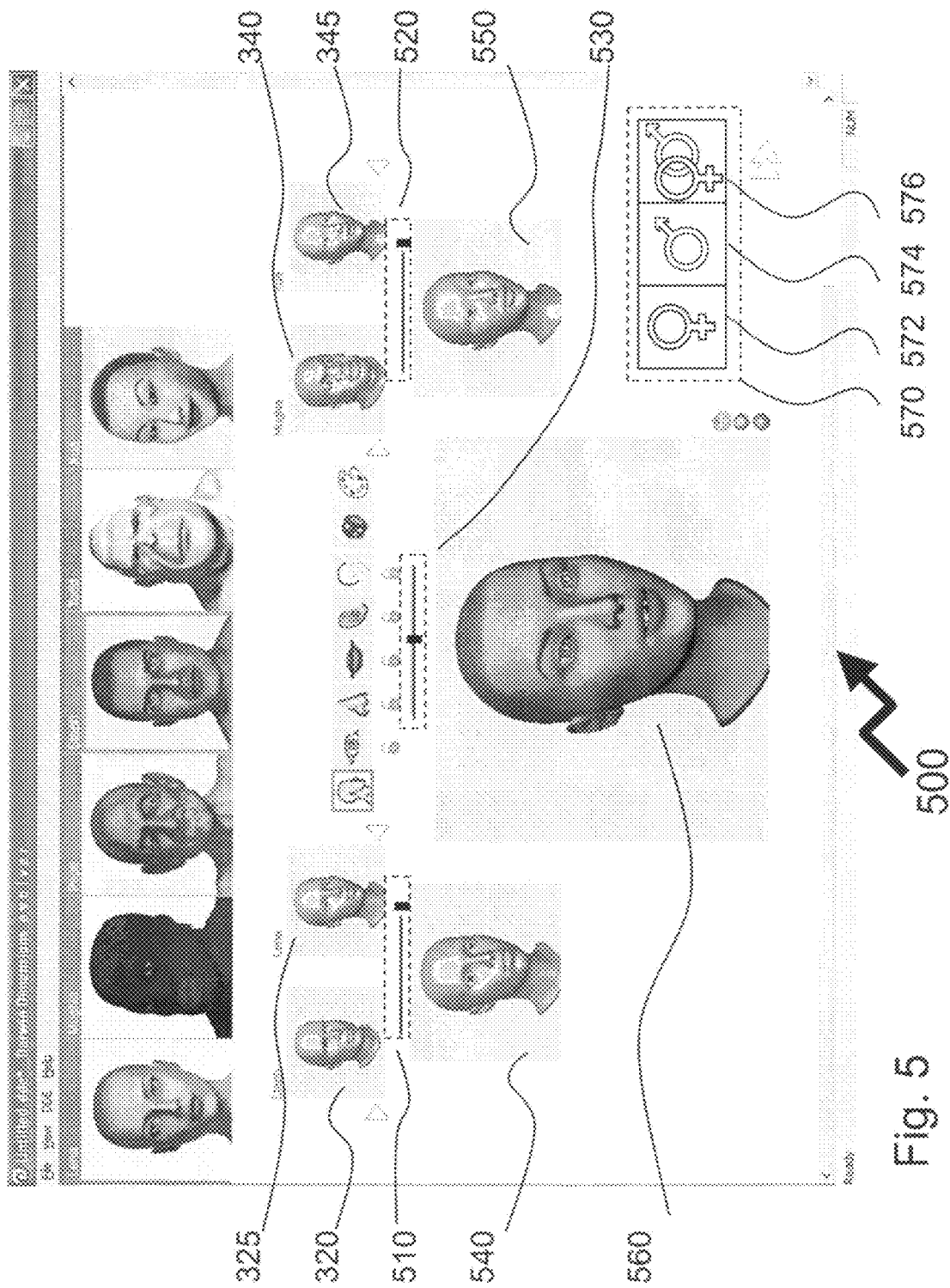
FIG. 5 illustrates the three-generation inheritance based avatar generator of FIG. 3 highlighting slider-bars for weighting within each generation, and sex selection features according to the invention.

Now referring to FIG. 5 illustrated is a three-generation inheritance based avatar generator 500, equivalent to three-generation inheritance based avatar generators 300 of FIG. 3 and 400 of FIG. 4. As in these previous generators the inheritance based avatar generator 500 has avatar grandparents "Steph" 314 as paternal grandfather 320, "Lena" 311 as paternal grandmother 325, "MugNa" 312 as maternal grandfather 340, and "Xua" 316 as maternal grandmother 345. In the instant example the user has moved the parental slider-bar 510 to the rightmost position, favoring the female grandparent "Lena" 311 on the paternal side, resulting in "Weighted Parent 1" 540. Similarly, maternal slider-bar 520 has been set to its rightmost position, favoring the female grandparent "Xua" 316 on the maternal side, resulting in "Weighted Parent 2" 550. In generating the weighted third generation avatar-off-spring 560 the third generation inheritance based avatar generator 500 utilizes family weighting slide-bar 530 to adjust the weighting applied between "Weighted Parent 1" 540 and "Weighted Parent 2" 550.

However, three-generation inheritance based avatar generator 500 also contains sex selector toolbar 570 which contains three function buttons, female limiter 572, male limiter 574, and male-female delimiter 576. Selection of one of the three function buttons 572 through 576 triggers resetting of the weightings of the three sliders, parental slider-bar 510, maternal slider-bar 520, and family weighting slide-bar 530. The weightings applied with selection of the male-female delimiter 576 allow the avatar to be either male or female, or alternatively androgynous. The weightings applied with either female limiter 572 or male limiter 574 being established such that the sex of the weighted third generation avatar-off-spring 560 is restricted to female and male respectively. Alternatively, the weightings of the sliders may be unaffected and the third-generation avatar-off-spring 560 is processed to modify predetermined physical characteristics in a manner based upon rules established within the third-generation inheritance based avatar generator 500 as originally implemented or as modified by the avatar generator. Such rules may be as simple as removing breasts, re-shaping lips, or more complicated such as re-weighting body ratios such as hip-thigh, shoulder-waist, height-arm, etc.

Figure 6:
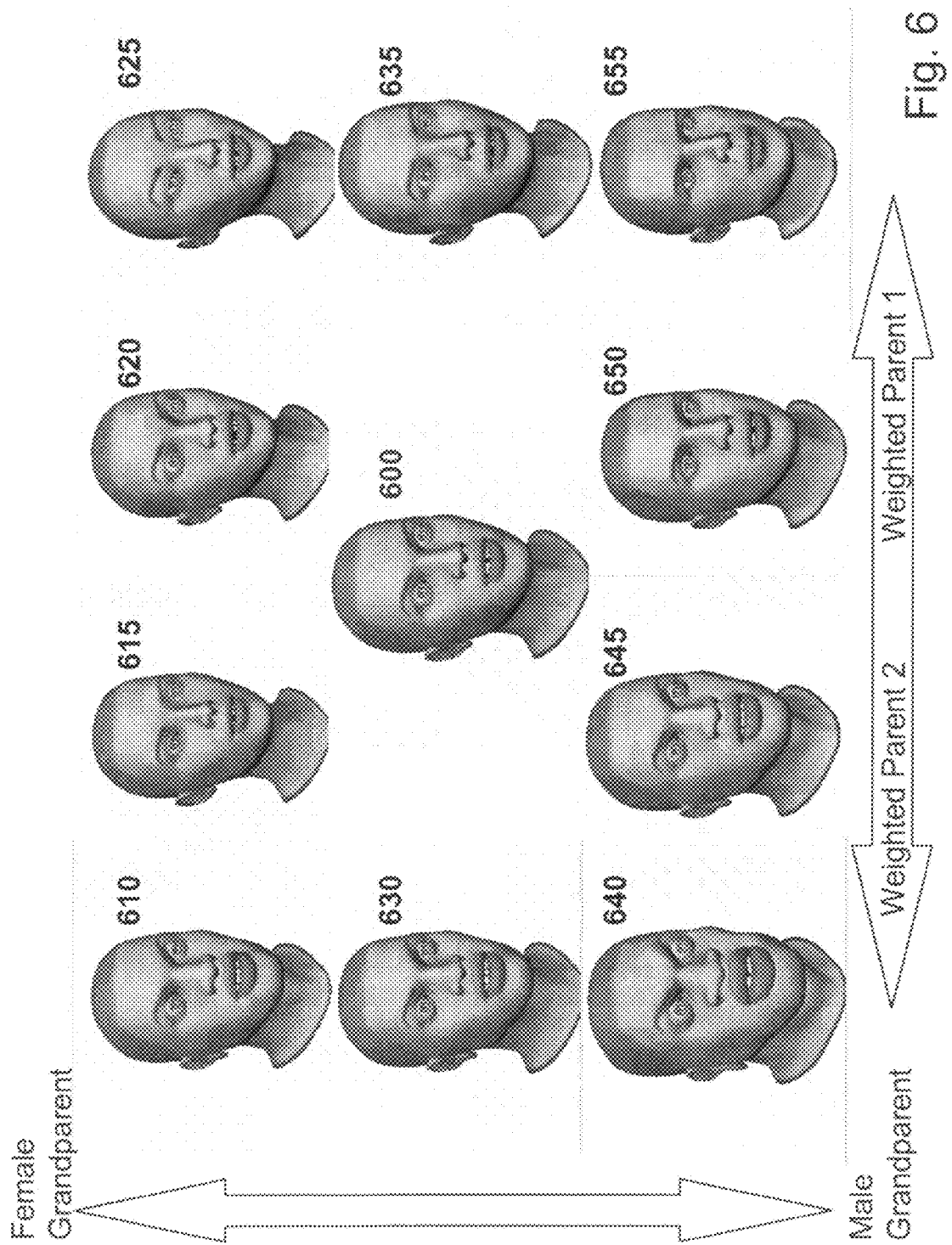
FIG. 6 illustrates a subset of the different possible grandchildren avatar heads generated according to varying weightings of grandparents according to an embodiment of the invention wherein no sex selection is performed.

It is evident therefore that using the different slide-bars within the third generation inheritance based avatar generators, such as 300 of FIG. 3, 400 of FIG. 4 and 500 of FIG. 5, allows the user to weight between parents, and grandparents, generating according to the characteristics of the slide-bars in respect of discrete settings available to the user, and weightings applied from these settings in merging the parents and grandparents. This can be seen in FIG. 6 where a series of avatars 600 through 655 are portrayed representing avatars generated using a third generation inheritance avatar generator 400 with three sliders, parental slider-bar 410, maternal slider-bar 420, and family weighting slide-bar 430, with each having only 3 settings, full one side, middle, and full other side. The resulting 11 avatars 600 through 655 showing a wide range of facial structures using "Steph" 314 as paternal grandfather 320, "MugNa" 312 as maternal grandfather 340, "Lena" 311 as paternal grandmother 325, and "Xua" 316 as maternal grandmother 345.

It would be evident that providing each of the three sliders, paternal slider-bar 410, maternal slider-bar 420, and family weighting slide-bar 430, with 3 settings provides 27 off-spring variants from just the four grandparents. Simply expanding each slider to 5 settings provides 125 off-spring, and 10 settings gives 1000 off-spring variants. Similarly expanding the number of male grandparents to 4 and the number of female grandparents to 4 provides 12 combinations of male grandparents, $P[male]_2^4$, and 12 combinations of female grandparents, $P[female]_2^4$, resulting in 144,000 variants for simple 5 setting sliders. Clearly, such sliders provide a fast, user-friendly manner for an avatar generator utilizing the three-generation inheritance based avatar generator to generate a wide range of characters, for use for example in providing characters in a crowd, or providing a director or producer of audio-visual content with real-time adjustment and refinement of a character, who will for example be a central character within the audio-visual content.

Figure 7:
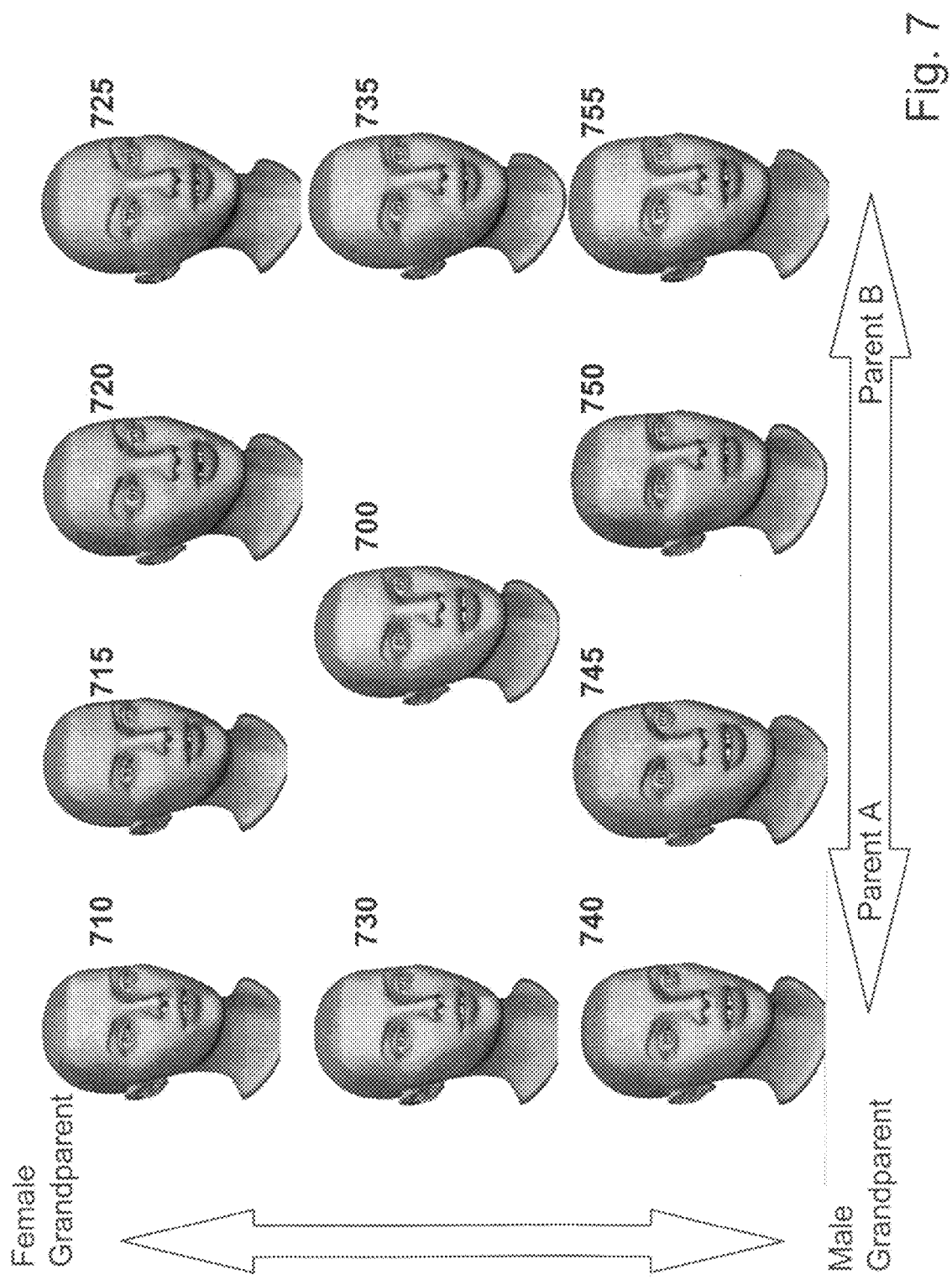
FIG. 7 illustrates a subset of the different possible grandchildren avatar heads generated according to varying weightings of grandparents according to an embodiment of the invention wherein sex selection is enabled, and established to the female sex.

Now referring to FIG. 7 the third generation inheritance avatar generator 400 with three sliders, parental slider-bar 410, maternal slider-bar 420, and family weighting slide-bar 430 is employed, but now the female limiter 572 has been engaged, thereby limiting the avatars to females. Accordingly in FIG. 7 a second series of avatars 700 through 755 is portrayed representing avatars generated using the three sliders, paternal slider-bar 410, maternal slider-bar 420, and family weighting slide-bar 430, again each having only 3 settings, full one side, middle, and full other side. The resulting 11 avatars 700 through 755 showing a moderate range of facial structures using "Steph" 314 as paternal grandfather 320, "MugNa" 312 as maternal grandfather 340, "Lena" 311 as paternal grandmother 325, and "Xua" 316 as maternal grandmother 345. Whilst the influence of male antecedents is visible, such as maternal grandfather 340, in eighth avatar 740 clearly the full male influence of "MugNa" 312 is not as evident as with the eighth avatar 640 when there is no limitation to the sex of the avatar generated.

Whilst the exemplary embodiments presented in FIGS. 3 through 7 are presented in respect of generating the head of the avatar these represent one step for the avatar generator creating the avatar using the third-generation inheritance based avatar generator. Additional steps being the generation of the torso of the avatar, and the provisioning of non-physical characteristics such as clothing, jewelry, etc. As such, in FIG. 8 full torso avatars generated according to a second step using the third-generation inheritance based avatar generator 400 are shown, the first step being depicted in FIG. 7.

In particular, FIG. 8 shows full torso views of paternal grandmother 325, Lena" 311, and maternal grandmother 345, "Xua" 316 as reference torsos in this embodiment where female limiter 572 is engaged. Also shown are 6 avatar torsos 810 through 860 as the paternal slider-bar 410, maternal slider-bar 420, and family weighting slide-bar 430 are employed, but their weightings due to the female limiter 572 are now restricted to weightings favoring maternal grandparents, apart from neutral, in the cases of paternal and maternal slider-bars 410 and 420, and favoring maternal parent with family weighting slide-bar 430.

In the embodiments of the invention presented supra the inheritance based avatar generation process has been presented in respect of a human procreation model with two parents for each off-spring and weighting applied between each pair of parents within each of the first and second generations giving rise to the third generation. Whilst the weightings applied have been discussed in respect of slider bars it would be apparent that alternative methods of user selection of the weighting are possible, including implementations of dials, knobs, etc and entry by the user of a percentage, ratio or other indicator.

Optionally, the inheritance based avatar generator may be implemented with N parents, wherein N>2, for each off-spring, and a weighting $W_m$ is provided by the user for all but one parent, i.e. providing N–1 weightings, where $$\sum_{m=1}^{N} W_m = 1.$$

The final weighting being automatically calculated. Alternatively the user may also be provided with a random weighting function, wherein a pseudo-random number generator provides the weightings for the current selection of parents. It would also be apparent that the avatar generator may select any combination of parents, and hence whilst the embodiments supra employ human, or humanoid, parents such a limitation is only for ease of presentation and understanding. No such limitation exists for the avatar generator other than the avatars within the pool have formats compatible with the inheritance based avatar generator process.

Further optionally, the inheritance based avatar generator supports inheritance of "recessive" characteristics. This is, essentially, another form of randomization. Thus, according to an aspect of the instant invention the "Random" 717 feature may be used to support toggling of the "recessive" characteristics on and off. For instance, at least some of the grandparent and/or parent avatars possess "recessive" characteristics within their definition. These are characteristics that typically are not visually apparent in the said avatar's simulated physical appearance, but which nevertheless are capable of being "passed on" to subsequent generations of avatars. When two avatars having such "recessive" characteristics are combined, then there is a statistically determined probability that the resulting Off-Spring avatar will express the characteristic in its simulated physical appearance. For instance, the Off-Spring avatar may be unexpectedly a red-head, even though none of the ancestor avatars has red hair. Of course, should the user decide to disable "recessive" characteristics using, for instance, the "Random" 717 feature, then the same avatar would instead have hair color that is determined as a weighted average of the hair color of the ancestor avatars, as described supra.

When "recessive" characteristics are enabled, then at least two avatars of an available pool of avatars have at least one physical characteristic that includes a "recessive variant." Optionally, the "recessive variant" is the same for each of the at least two avatars, such than any Off-Spring thereof expresses the "recessive variant," without any weighting to favor any of the at least two avatars. Further optionally, each of the at least two avatars has a uniquely defined "recessive variant." For instance, continuing the red head example, the "recessive variant" for one of the at least two avatars results in dark auburn hair and the "recessive variant" for the other of the at least two avatars results in bright red hair. The user optionally uses a weighting bar to favor the "recessive variant" of one of the at least two avatars, thereby selecting a hair color intermediate dark auburn and bright red.

Off-Spring avatars, which are generated using an avatar generator according to an embodiment of the instant invention, may be used to "populate" interactive or non-interactive applications, such as for instance video and computer games, on-line virtual environments for social networking or dating, movies, advertisements, etc. In the case of on-line gaming and on-line virtual environments, optionally the avatar generator is hosted on a computer system that is remote from the user, or the avatar generator is downloaded to a computer system that is local to the user. For instance, the avatar generator may be downloaded as part of the initial software download by a new user upon joining an on-line virtual environment or on-line gaming community. The parameters that define the generated Off-Spring avatar may be transferred from the user's local computer system to the local computer systems of other users that interact with the user within the virtual environment. Software that is installed on the local computer systems of the other users then generates a representation of the Off-Spring avatar, based on the parameters received from the user.

Numerous other embodiments may be envisaged without departing from the spirit or scope of the invention.

What is claimed is:

1. A method, comprising:
   providing at least two avatars via an avatar generator, each one of the at least two avatars having a different simulated physical appearance that is defined in terms of a plurality of inheritable characteristics;
   providing a first weighting factor via the avatar generator for defining a relative contribution of at least one of the plurality of inheritable characteristics from each of the at least two avatars to a simulated physical appearance of an Off-Spring avatar, the first weighting factor selected by a user;
   providing an indication of the sex of the Off-Spring avatar;
   designating a first inheritable characteristic associated with at least one of the two avatars as being a recessive characteristic, wherein a first avatar of the two avatars is associated with a first recessive variant of the recessive characteristic, a second avatar of the two avatars is associated with a second recessive variant of the recessive characteristic, and the first recessive variant is different than the second recessive variant;
   providing a second weighting factor via the avatar generator for defining a relative contribution of the first recessive variant and the second recessive variant;
   generating the Off-Spring avatar in dependence upon the plurality of inheritable characteristics of the at least two avatars, the first weighting factor, the second weighting factor, and the indication of the sex of the Off-Spring avatar; and
   at least one of storing the Off-Spring avatar on a computer readable storage medium and displaying the simulated physical appearance of the Off-Spring avatar to the user.

2. A method according to claim 1, wherein providing at least two avatars comprises:
   selecting a first physical characteristic;
   providing a first avatar with the selected first physical characteristic, the first avatar having a plurality of physical characteristics;
   selecting a second physical characteristic; and
   providing a second avatar with the selected second physical characteristic, the second avatar having a plurality of physical characteristics.

3. A method according to claim 1 wherein, the indication of the sex of the avatar is provided by the user.

4. A method according to claim 1, wherein providing the first weighting factor comprises,
   providing an inheritance slider, and wherein the user adjusts the position of a slider bar indicating-portion of the inheritance slider for providing an indication of the first weighting factor.

5. A method comprising:
   providing a virtual environment, the virtual environment supporting a plurality of avatars associated with a plurality of users, each avatar having a plurality of physical characteristics;
   providing within the virtual environment an ability for at least two avatars to have an Off-Spring avatar;
   designating an inheritable characteristic associated with the at least two avatars as being a recessive characteristic, wherein a first avatar of the at least two avatars is associated with a first recessive variant of the recessive characteristic, a second avatar of the at least two avatars is associated with a second recessive variant of the recessive characteristic, and the first recessive variant is different than the second recessive variant;
   providing a weighting via the virtual environment for defining a relative contribution of the first recessive variant and the second recessive variant;
   generating the Off-Spring avatar, in dependence upon at least some of the plurality of physical characteristics of the at least two avatars, the weighting, and an indication of the sex of the Off-Spring avatar provided by at least a user of the plurality of users; and
   at least one of storing the off-spring avatar on a computer readable storage medium and displaying a simulated physical appearance of the Off-Spring avatar to the user.

6. A method according to claim 5, wherein:
generating the Off-spring avatar comprises:
selecting a first physical characteristic of at least one of the at least two avatars;
selecting a second physical characteristic of at least another one of the at least two avatars; and
generating the Off-Spring avatar by combining the first and second physical characteristics of the at least two avatars in accordance with a second weighting.

7. A method, comprising:
(a) providing a current generation of avatars comprising at least two different avatars, each of the at least two different avatars having at least one physical characteristic contributing to a unique simulated physical appearance thereof;
(b) receiving from a user a first weighting factor for establishing a weighting in combining the at least one physical characteristic of the at least two different avatars;
(c) receiving from the user an indication of the sex of a next generation avatar;
designating a first inheritable characteristic associated with at least one of the two avatars as being a recessive characteristic, wherein a first avatar of the two avatars is associated with a first recessive variant of the recessive characteristic, a second avatar of the two avatars is associated with a second recessive variant of the recessive characteristic, and the first recessive variant is different than the second recessive variant;
receiving from the user a second weighting factor for defining a relative contribution of the first recessive variant and the second recessive variant;
(d) executing an inheritance based avatar generator process for generating a next generation avatar, the at least one physical characteristic of the next generation avatar being established in dependence upon the at least one physical characteristic of each of the at least two different avatars, the first weighting factor, the second weighting factor, and the indication of the sex of the next generation avatar; and
(e) at least one of storing on a computer readable storage medium data relating to the at least one physical characteristic of the next generation avatar and displaying the next generation avatar to the user.

8. A method according to claim 7, wherein receiving from the user the first weighting factor comprises providing an inheritance slider, and wherein the user adjusts the position of a slider bar indicating-portion of the inheritance slider for providing an indication of the first weighting factor.

9. A method according to claim 7, wherein at least one of the two different avatars has a plurality of different physical characteristics, the plurality of different physical characteristics in combination defining the simulated physical appearance of the at least one of the two different avatars.

10. A method according to claim 9, wherein receiving from the user the first weighting factor comprises receiving from the user a plurality of weighting factors, each weighting factor of the plurality of weighting factors for establishing a weighting in combining one physical characteristic of the plurality of different physical characteristics.

11. A method according to claim 10, wherein receiving from the user a plurality of weighting factors comprises providing a plurality of inheritance sliders, and wherein the user adjusts the positions of slider bar indicating-portions of the plurality of inheritance sliders for providing an indication of the plurality of weighting factors.

12. A method according to claim 11, wherein the indicating-portion of each of the plurality of inheritance sliders is set to a same position.

13. A method according to claim 11, wherein the indicating-portion of each of the plurality of inheritance sliders is adjustable independently.

14. A method according to claim 7, wherein providing the current generation of avatars comprises selecting at least a paternal avatar and a maternal avatar from an available pool of avatars.

15. A method according to claim 7, wherein the current generation of avatars is chosen to be the same sex.

16. A method according to claim 7, wherein providing the current generation of avatars comprises:
providing a previous generation of avatars comprising a first pair of avatars and a second pair of avatars, each avatar of the previous generation of avatars having at least one physical characteristic contributing to a simulated physical appearance thereof; and,
executing an inheritance based avatar generator process for generating a first avatar as a weighted combination of the first pair of avatars and for generating a second avatar as a weighted combination of the second pair of avatars, the first and second avatars forming at least a portion of the current generation of avatars.

17. A method according to claim 16, wherein executing the inheritance based avatar generator process comprises providing an indication of the sex of at least one of the first avatar and the second avatar.

18. A method according to claim 7, comprising:
performing (b) through (d) with a first pair of avatars, thereby generating a first next generation avatar;
performing (b) through (d) with a second pair of avatars, at least one of the second pair of avatars being different to the first pair of avatars, thereby generating a second next generation avatar;
receiving from a user a weighting factor for establishing a weighting in combining the at least one physical characteristic of the first next generation avatar and the second next generation avatar;
receiving from the user an indication of the sex of a third next generation avatar;
executing an inheritance based avatar generator process for generating the third next generation avatar, the at least one physical characteristic of the third next generation avatar being established in dependence upon the at least one physical characteristic of the first and second next generation avatars, the weighting factor and the indication of the sex of the third next generation avatar; and
wherein (e) is performed using the third next generation avatar.

19. A method according to claim 7, wherein an indication of sex is at least one of male, female, transsexual, combination of male and female, and unassigned.

* * * * *